United States Patent [19]

Vogel

[11] 4,044,953
[45] Aug. 30, 1977

[54] CAGE FOR FLAILING TUBE

[75] Inventor: John D. Vogel, Northfield, Ohio

[73] Assignee: McCord Corporation, Detroit, Mich.

[21] Appl. No.: 708,931

[22] Filed: July 27, 1976

Related U.S. Application Data

[62] Division of Ser. No. 550,542, Feb. 18, 1975, abandoned.

[51] Int. Cl.² .......................... B05B 1/10; B05B 3/14; B08B 3/02
[52] U.S. Cl. .................................. 239/229; 137/179; 239/284 A; 239/288.5
[58] Field of Search .................. 239/4, 229, 284, 288, 239/288.3, 288.5; 134/179, 182, 183

[56] References Cited

U.S. PATENT DOCUMENTS 2,417,222  3/1947  Stine .................................. 239/229

FOREIGN PATENT DOCUMENTS 1,806,634  5/1970  Germany .......................... 239/229

Primary Examiner—Evon C. Blunk
Assistant Examiner—Andres Kashnikow
Attorney, Agent, or Firm—McGlynn and Milton

[57] ABSTRACT

A headlamp cleaning device comprising an elongated horn-like member having an open entrance at one end thereof, a flexible tube anchored within the cage member at a point spaced from the open entrance, the tube including a freely movable portion extending toward the entrance; and means for supplying a high velocity mixture of air and liquid to the tube whereby the tube directs a stream of the mixture toward the headlamp while simultaneously moving in an irregular path within the confines of the open entrance to continuously change the direction of the stream and clean a large area of the headlamp.

3 Claims, 3 Drawing Figures

U.S. Patent        Aug. 30, 1977        4,044,953
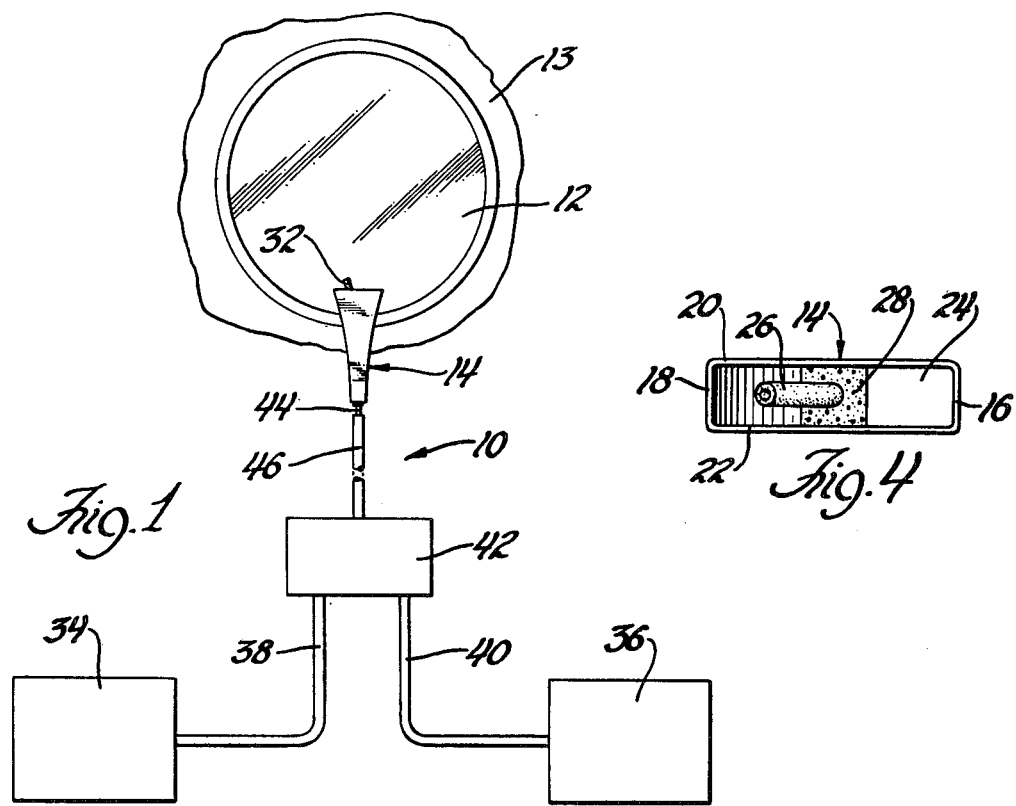
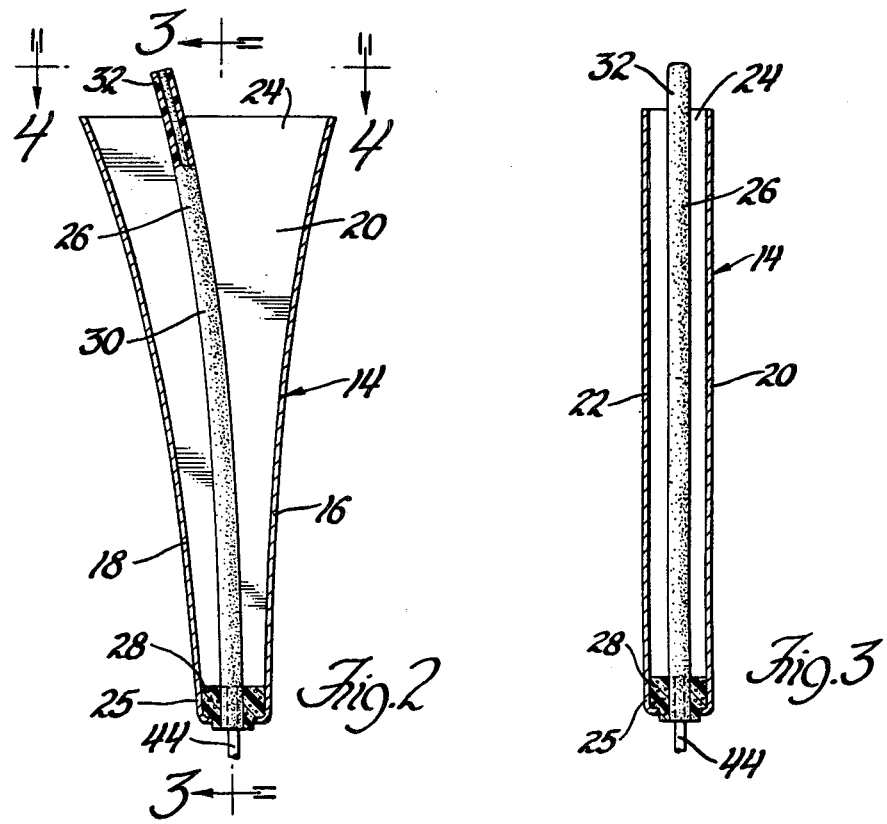

CAGE FOR FLAILING TUBE

This application is a divisional of application Ser. No. 550,542, filed Feb. 18, 1975, now abandoned.

This invention relates to a device for cleaning a surface and is particularly suited for cleaning the headlamps of a vehicle.

It is well known that, while operating a vehicle, dirt and other debris may accumulate on the headlamps. The intensity of the light emitted from a dirt-covered headlamp is, of course, less than optimum. The resulting reduced visibility of the operator of the vehicle caused by the diminished light intensity of the dirty headlamps oftentimes creates a safety hazard. In this regard, it is well known that, during nighttime driving, good visibility is required to permit adequate braking time in the case of an emergency.

On occasion, it is only necessary for the operator of the vehicle to periodically clean the headlamps by hand. An opportunity for such cleaning arises whenever the vehicle is stopped, such as when the vehicle is being serviced. When road and weather conditions are particularly adverse and the headlamps become dirty more frequently, it is oftentimes inconvenient or impractical for the operator to repeatedly stop the vehicle for the purpose of cleaning the headlamps. Accordingly, many automatic headlamp cleaning systems have been suggested for mechanically cleaning the headlamps of a vehicle in a fashion similar to that employed to clean the windshield of the vehicle.

One family of headlamp cleaning devices employs a wiper or brush which is moved back and forth across the face of the headlamp by means of a motor and suitable mechanical linkage. Such devices oftentimes include means for delivering a cleaning fluid to the face of the headlamp to facilitate the cleaning operation. Devices of this nature, however, are inherently quite bulky and, due to the fact that the motor and mechanical linkage must be located in close proximity to the headlamps, finding sufficient space for locating such devices often presents a problem. Moreover, devices of this type require considerable maintenance. The electric motor is subject to periodic failure and the relatively large number of moving parts increase the likelihood of breakbown due to part breakage or misalignment.

Another family of headlamp cleaning devices operates by directing a stream of cleaning fluid toward the surface of the headlamp. Such devices rely upon the forceful impingement of the cleaning fluid on the surface to remove dirt and other debris. Merely supplying a spray of liquid in this fashion is oftentimes inadequate since the liquid cannot be propelled at a sufficient velocity to satisfactorily remove the dirt and debris. Moreover, since the fluid-emitting nozzle in devices of this type is normally stationary, only a limited surface area of the headlamp experiences direct impingement by the cleaning fluid. Accordingly, peripheral portions of the headlamp, which fall outside of those areas directly hit by the spray of fluid, may not be adequately cleaned.

In light of the foregoing, the instant invention provides a headlamp cleaning or washing device which is of a relatively simple and compact design thus permitting convenient installation and reducing maintenance to a minimum. The headlamp washing device of the instant invention, although being of the fluid-impingement type, is capable of adequately cleaning the surface of the headlamp since the cleaning fluid is propelled at relatively high velocities. In order to achieve the high velocities required for adequate cleaning, a supply of cleaning fluid under pressure is mixed with a high velocity stream of air and such mixture is thereafter directed toward the surface of the headlamp. The airstream carries droplets of the fluid at a much greater velocity than the fluid can travel alone under similar pressures. Moreover the entire surface of the headlamp is cleaned by providing a movable fluid delivery tube which automatically describes a cleaning area by moving in a substantially irregular path within a confined area. The point of impingement of the cleaning fluid/air mixture is therefore continually changed so that all sections over the surface of the headlamp are subjected to direct fluid impingement.

Other advantages of the present invention will be readily appreciated as the same becomes better understood by reference to the following detailed description when considered in connection with the accompanying drawings wherein:

FIG. 1 is a partially schematic, front-elevational view of a headlamp cleaning device constructed in accordance with the instant invention located adjacent a vehicle headlamp;

FIG. 2 is a longitudinal, cross-sectional view of the primary component of the instant invention;

FIG. 3 is a longitudinal cross-sectional view taken generally along line 3—3 of FIG. 2; and FIG. 4 is a plan-view taken generally along line 4—4 of FIG. 2.

Referring to the drawings, a headlamp washing device constructed in accordance with the instant invention is generally shown at 10. As will hereinafter be described, the headlamp washing device is located so as to direct a high-velocity mixture of cleaning fluid and air toward the surface of the headlamp 12 of a vehicle. As shown in FIG. 1, the headlamp 12 is mounted in a portion 13 of the body of the vehicle.

As shown in FIG. 2, the device 10 includes a jetspray nozzle comprising an elongated cage member which is generally indicated at 14. The cage member 14 comprises a pair of oppositely disposed, curved or diverging end-walls 16 and 18 which are interconnected by a pair of sidewalls 20 and 22. The walls 16, 18, 20, and 22 form a hollow, horn-shaped member having an enlarged or flared open entrance 24 at the divergent ends of the walls 16 and 18 and a narrow throat 25 at the convergent ends thereof. As best shown in FIG. 4, the open entrance 24 of the cage member 14 is generally rectangular.

A flexible, curved tube 26, made of rubber, plastic, or other suitable material, is anchored within the throat 25 of the cage member 14. The tube 26 is anchored at a point spaced from the entrance 24 of the cage member 14. As shown in FIGS. 2 and 3, the tube 26 may be anchored by means of a plug 28 which is disposed in the throat 25 of the cage member 14. The plug 28 includes a bore for receiving and supporting the tube 26. A curved, freely movable portion 30 for the tube 26 extends from the plug 28 toward the entrance 24 of the cage member 14 and terminates in the vicinity thereof. As will hereinafter become apparent, the cage member controls or restricts the movement of the movable portion 30.

At this point, it is noted that the curvature of the tube 26 may be provided by imparting a permanent memory to the material of which it is made. That is, by plastic deformation of the tube 26 a permanent set is imparted so that the tube will naturally assume a curved shape when it is in a relaxed or unstressed condition. Alternatively, the curvature in the tube 26 may be induced by external means such as a curved coil spring or bent wire spring disposed internally or externally of the tube 26. Such an arrangement will also insure that the tube 26 always assumes a curved shape when relaxed or unstressed.

In the preferred embodiment of the headlamp cleaning device, the length of the tube 26 is such that the outlet end 32 is located slightly beyond the entrance 24 to the cage member 14.

A fluid source 34 for delivering a cleaning fluid under pressure is provided. The cleaning fluid may be water or some type of suitable cleaning solvent or a combination of the two. An air source 36 for providing air under pressure is also provided. Fluid under pressure is conducted from the fluid source 34 through a first line 38 while air under pressure is conducted from the air source 36 through a second line 40. These lines conduct the fluid and air to a suitable mixing device 42. The mixing device 42 may be of any construction which will combine the streams of fluid and air. In this regard, the mixing device 42 may comprise a T-connection which brings the two lines 38 and 40 together into a single line. Alternatively, an aspirator or other suitable type of mixing device may be employed. It is contemplated that a suitable electrical control circuit may be provided to control the delivery of fluid and air to the mixing device 42. In other words, a control switch may be located in the cab of the vehicle for activating the fluid and air sources through a suitable electrical circuit operated off of the vehicle's battery. A specific circuit design is not shown since the design of such is well within the ability of a knowledgeable mechanic.

In a functioning prototype of the invevtion, a ¼ inch diameter line is employed to conduct fluid from the fluid source 34 to the mixing device 42 while a ⅜ inch diameter line is employed to conduct air from the air source 36 to the mixing device 42. The tube 26 employed is one which has an internal diameter of one one-eighth. Both the air and fluid are supplied at approximately 80 psi. However, slightly higher or lower pressures may be used. In this regard, it is pointed out that one of the important applications of the headlamp washing device of the instant invention is in trucks and other large vehicles. As is well known, trucks generally are equipped with an air brake system. Accordingly, there is a ready supply of air under pressure for use in the device. Such air brake systems are normally operated at air pressures of between 80 and 125 psi. Accordingly, the preferred embodiment of invention was designed with these pressures in mind. The truck's own air pressure may be used to supply the air under pressure as well as to pressurize the fluid in the fluid source 34.

A rigid tube 44, which is preferably made of metal, is inserted into the anchored end of the flexible tube 26. The fluid/air mixture is conducted from the mixing device 42 to the rigid tube 44 through an intermediate conducting tube 46. The rigid tube 44 may be of a reduced diameter thus producing a constriction which increases the pressure and, therefore, the velocity of the mixture. In short, the rigid tube 44 serves as a nozzle to increase the velocity of the fluid/air mixture entering the flexible tube 26.

It should be pointed out that fluid alone under 80 pounds pressure flows at a far lower velocity than air at the same pressure. Due to the high velocity stream of air into which the fluid is introduced, a mixture of fluid and air is produced which moves at a velocity far exceeding that of the fluid alone. As suggested above, the high velocity mixture is introduced into the anchored end of the flexible tube 26 through the rigid tube 44.

The high velocity mixture passing through the tube 26 causes it to move about at a high rate of speed. More specifically, at the outset, the force of the fluid/air mixture passing through the flexible, curved tube 26 and exiting through the outlet end 32 forces the tube 26 to move to the right from the position shown in FIG. 2. When the flexible tube 26 strikes the wall 16, it tends to bend or deform the tube 26 so that the outlet end 32 points toward the right. Accordingly, the tube is forced to move toward the left from the right hand side of the cage member 14. The tube 26 continues to move back and forth between the sidewalls 16 and 18 as long as the fluid/air mixture is forced through the tube 26. A front-to-rear component of motion is also induced das the tube 26 moves from side to side in the cage member 14. This occurs because of the somewhat erratic or uncontrolled motion of the outlet end 32. Consequently, the tube 26 moves in a substantially irregular path within the confined area defined by the open entrance 24 of the cage member 14. It is noted that, due to the high velocity of the fluid/air mixture leaving the tube 26, the irregular movement of the tube 26 proceeds at an exceedingly rapid rate.

Although a permanently curved tube 26 is employed, it is felt that a straight, but flexible, tube would also move in the manner described above. The reaction force of the high velocity mixture leaving the tube would tend to bend it. Once this occurs the flailing motion of the tube would begin and continue until the flow of the fluid/air mixture is terminated.

As shown in FIG. 1, the cage member 14 of the jet-spray nozzle is mounted adjacent the headlamp 12 of the vehicle. The cage member 14 is positioned so that the open entrance 24 faces the surface of the headlamp 12. As described herein, the continuous motion of the tube 32 during delivery of the fluid/air mixture causes the direction of the spray changes. The size of the open entrance 24 is such that, over an increment of time, an area approximately the size of the headlamp will be described by the tube. This, of course, takes into account the distance between the jet-spray nozzle and the headlamp. Accordingly, over a short period of time a large area of the surface of the headlamp 12 experiences direct impingement by the mixture.

Since the surface of most headlamps are curved, it is contemplated that a second jet-spray nozzle be located above the headlamp 12 and directed downwardly toward the headlamp 12. With this arrangement the lower half of the headlamp is cleaned by the lower jet-spray nozzle and the upper half of the headlamp is cleaned by the upper jet-spray nozzle. The second or upper jet spray nozzle is not shown since it is substantially identical to the lower one. Suffice it to say, however, that it is also supplied with a high velocity fluid-/air mixture from the mixing device 42.

A number of advantages are gained by employing the headlamp cleaning device of the instant invention. First of all, the fluid source 34 and air source 36 may be conveniently located at positions remote from the headlamp. The specific embodiments of the mixing device 42, which are suuggested above, are relatively small and can be located without difficulty near the headlamp 12. It should be apparent that the jet spray nozzle is of a simple design and requires minimal maintenance. The entire surface of the headlamp is cleaned because the tube is not stationary. The cage member 14 of the jet spray nozzle permits limited movement of the flexible tube 26 within an area defined by the open entrance 24. Over a short period of time such movement of the flexible tube 26 describes a cleaning area which covers a substantial portion of the headlamp surface. Due to the high velocity of the mixture, which is achieved by the airstream, the dirt or debris on the surface of the headlamp 12 is literally blasted off. Due to the efficiency of cleaning, only a short blast lasting a few seconds is required to completely clean the headlamp.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for directing fluid toward a surface comprising; cage means having an open entrance at one end thereof, a flexible tube having a first end anchored within said cage member at a point spaced from said entrance, said tube including a freely movable portion extending toward said entrance and terminating at a second end adjacent said open entrance, said cage means including a pair of oppositely disposed curved walls, said curved walls being curved away from one another upwardly and outwardly toward said open entrance and away from the longitudinal direction of the flexible tube for engaging said tube to curve said tube between the ends thereof.

2. An assembly as set forth in claim 1 wherein said cage means includes a pair of opposed sidewalls interconnecting said curved walls.

3. An assembly as set forth in claim 2 wherein said cage means has a generally rectangular cross section with said curved walls defining the ends of the rectangle.

* * * * *